(12) United States Patent
Aoyama et al.

(10) Patent No.: US 6,999,750 B2
(45) Date of Patent: Feb. 14, 2006

(54) PREPAID SYSTEM, METHOD THEREOF, AND COMMUNICATION TERMINAL

(75) Inventors: Harumi Aoyama, Yokosuka (JP); Norikazu Umeda, Yokohama (JP); Makoto Jinguuji, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 204 days.

(21) Appl. No.: 10/419,907

(22) Filed: Apr. 22, 2003

(65) Prior Publication Data

US 2003/0199265 A1   Oct. 23, 2003

(30) Foreign Application Priority Data

Apr. 23, 2002  (JP) ............................. 2002-121153
Jul. 30, 2002   (JP) ............................. 2002-222093

(51) Int. Cl.
*H04M 11/00*  (2006.01)
*H04M 17/00*  (2006.01)
*H04M 15/00*  (2006.01)

(52) U.S. Cl. .................. 455/406; 455/408; 379/114.2; 379/144.01

(58) Field of Classification Search ............... 455/405, 455/407–408, 425, 550.1; 379/114.2, 121.01, 379/121.03; 235/380–383; 705/64, 69–70, 705/72

See application file for complete search history.

(56) References Cited

U.S. PATENT DOCUMENTS

| 5,909,485 | A  | * | 6/1999 | Martin et al. ............ 379/114.2 |
| 5,991,381 | A  | * | 11/1999 | Bouanaka et al. ..... 379/114.15 |
| 6,424,706 | B1 | * | 7/2002 | Katz et al. ............. 379/144.01 |
| 6,526,130 | B1 | * | 2/2003 | Paschini .................. 379/93.12 |
| 6,529,593 | B1 | * | 3/2003 | Nelson .................... 379/114.2 |
| 6,628,766 | B1 | * | 9/2003 | Hollis et al. ............. 379/114.2 |
| 6,793,135 | B1 | * | 9/2004 | Ryoo .......................... 235/383 |

FOREIGN PATENT DOCUMENTS

JP  2001-325541  11/2001

* cited by examiner

*Primary Examiner*—Binh K. Tieu
(74) *Attorney, Agent, or Firm*—Oblon, Spivak, McClelland, Maier & Neustadt, P.C.

(57) ABSTRACT

There is provided a prepaid system able to reduce inconvenience caused by issuing and using a large number of prepaid cards. A communication terminal purchases a prepaid number related to a predetermined amount of money by using a deposit of the communication terminal made in advance and managed by the prepaid system, and pays for its communication charge using the predetermined amount of money related to the prepaid number. Or, the communication terminal uses a prepaid count set in advance and managed by the prepaid system to pay for its communication charge before or after the communication made by the communication terminal. Or, the communication terminal assigns a part of its prepaid count managed by the prepaid system to other communication terminals to pay for their communication charges before or after the communications made by the other communication terminals.

20 Claims, 17 Drawing Sheets

FIG.2

|  | PHONE NO. | DEPOSIT |
|---|---|---|
| COMMUNICATION TERMINAL 1 | TEL_1 | BL_1 |
| COMMUNICATION TERMINAL 2 | TEL_2 | BL_2 |
| ⋮ | ⋮ | ⋮ |

FIG.3

| TYPE | PREPAID NUMBER | STATUS | |
|---|---|---|---|
| P | NUM_P_A | NOT USED | NOT ASSIGNED |
| | NUM_P_B | NOT USED | ASSIGNED |
| | NUM_P_C | EXPIRED | ASSIGNED |
| | ⋮ | ⋮ | ⋮ |
| Q | NUM_Q_A | EXPIRED | ASSIGNED |
| | NUM_Q_B | NOT USED | NOT ASSIGNED |
| | NUM_Q_C | EXPIRED | ASSIGNED |
| | ⋮ | ⋮ | ⋮ |
| ⋮ | ⋮ | ⋮ | ⋮ |

FIG.7

|  | REMAINING COUNTS | REMITTED COUNTS |
|---|---|---|
| 090-111-1111 (USER A) | 10,000 | 0 |

FIG.8

|  | REMAINING COUNTS | REMITTED COUNTS |
|---|---|---|
| 090-111-1111 (USER A) | 9,000 | 0 |
| 090-222-2222 (USER B) | 0 | 0 |

FIG.9

| SOURCE | TARGET | REMITTED COUNTS | FLAG |
|---|---|---|---|
| 090-111-1111 (USER A) | 090-222-2222 (USER B) | 1,000 | ON |

FIG.10

|  | REMAINING COUNTS | REMITTED COUNTS |
|---|---|---|
| 090-111-1111 (USER A) | 9,000 | 0 |
| 090-222-2222 (USER B) | 0 | 1,000 |

FIG.11

|  | REMAINING COUNTS | REMITTED COUNTS |
|---|---|---|
| 090-111-1111 (USER A) | 9,000 | 0 |
| 090-222-2222 (USER B) | 1,000 | 0 |

FIG.14

| GROUP NO. | PHONE NO. | CONTRACT | REMAINING COUNTS |
|---|---|---|---|
| – | A | COMMON CELLULAR PHONE | 10,000 |
| Gn | B | PREPAID CELLULAR PHONE | 0 |
| Gn | C | COMMON CELLULAR PHONE | 0 |

FIG.15

| SOURCE | TARGET | REMITTED COUNTS | FLAG |
|---|---|---|---|
| A | B | 1,000 | ON |

FIG.16

| USER | AVAILABLE COUNTS |
|---|---|
| B | 0 |

FIG.17

| GROUP NO. | PHONE NO. | CONTRACT | REMAINING COUNTS |
|---|---|---|---|
| - | A | COMMON CELLULAR PHONE | 9,000 |
| Gn | B | PREPAID CELLULAR PHONE | 0 |
| Gn | C | COMMON CELLULAR PHONE | 0 |

FIG.18

| SOURCE | TARGET | REMITTED COUNTS | FLAG |
|---|---|---|---|
| A | B | 1,000 | OFF |

FIG.19

| USER | AVAILABLE COUNTS |
|---|---|
| B | 1000 |

FIG.20

| GROUP NO. | PHONE NO. | CONTRACT | REMAINING COUNTS |
|---|---|---|---|
| - | A | COMMON CELLULAR PHONE | 10,000 |
| Gn | B | PREPAID CELLULAR PHONE | 0 |
| Gn | C | COMMON CELLULAR PHONE | 0 |

FIG.21

| SOURCE | TARGET | REMITTED COUNTS | FLAG |
|---|---|---|---|
| A | B | 1,000 | ON |
| A | C | 1,000 | ON |

FIG.22

| USER | AVAILABLE COUNTS |
|---|---|
| B | 0 |

FIG.23

| USER | REMITTED COUNTS |
|---|---|
| C | 0 |

FIG.24

| GROUP NO. | PHONE NO. | CONTRACT | REMAINING COUNTS |
|---|---|---|---|
| – | A | COMMON CELLULAR PHONE | 8,000 |
| Gn | B | PREPAID CELLULAR PHONE | 0 |
| Gn | C | COMMON CELLULAR PHONE | 0 |

FIG.25

| SOURCE | TARGET | REMITTED COUNTS | FLAG |
|---|---|---|---|
| A | B | 1,000 | OFF |
| A | C | 1,000 | OFF |

FIG.26

| USER | AVAILABLE COUNTS |
|---|---|
| B | 1,000 |

FIG.27

| USER | REMITTED COUNTS |
|---|---|
| C | 1,000 |

FIG.28

| GROUP NO. | PHONE NO. | CONTRACT | REMAINING COUNTS |
|---|---|---|---|
| – | A | COMMON CELLULAR PHONE | 10,000 |
| Gn | B | PREPAID CELLULAR PHONE | 0 |
| Gn | C | COMMON CELLULAR PHONE | 0 |

FIG.29

| SOURCE | TARGET | TRANSFERRED COUNTS | FLAG |
|---|---|---|---|
| A | B | 1,000 | ON |

FIG.30

| GROUP NO. | PHONE NO. | CONTRACT | REMAINING COUNTS |
|---|---|---|---|
| − | A | COMMON CELLULAR PHONE | 9,000 |
| Gn | B | PREPAID CELLULAR PHONE | 1,000 |
| Gn | C | COMMON CELLULAR PHONE | 0 |

FIG.31

| SOURCE | TARGET | TRANSFERRED COUNTS | FLAG |
|---|---|---|---|
| A | B | 1,000 | OFF |

FIG.32

| GROUP NO. | PHONE NO. | CONTRACT | REMAINING COUNTS |
|---|---|---|---|
| – | A | COMMON CELLULAR PHONE | 10,000 |
| Gn | B | PREPAID CELLULAR PHONE | 0 |
| Gn | C | COMMON CELLULAR PHONE | 0 |

FIG.33

| SOURCE | TARGET | TRANSFERRED COUNTS | FLAG |
|---|---|---|---|
| A | B | 1,000 | ON |
| A | C | 1,000 | ON |

FIG.34

| GROUP NO. | PHONE NO. | CONTRACT | REMAINING COUNTS |
|---|---|---|---|
| – | A | COMMON CELLULAR PHONE | 8,000 |
| Gn | B | PREPAID CELLULAR PHONE | 1,000 |
| Gn | C | COMMON CELLULAR PHONE | 1,000 |

FIG.35

| SOURCE | TARGET | TRANSFERRED COUNTS | FLAG |
|---|---|---|---|
| A | B | 1,000 | OFF |
| A | C | 1,000 | OFF |

PREPAID SYSTEM, METHOD THEREOF, AND COMMUNICATION TERMINAL

This patent application is based on Japanese priority patent applications No. 2002-121153 filed on Apr. 23, 2002, and No. 2002-222093 filed on Jul. 30, 2002, the entire contents of which are hereby incorporated by reference.

BACKGROUND OF THE INVENTION

1. Field of the Invention

The present invention generally relates to the technical field of prepayment using communication terminals.

2. Description of the Related Art

In this technical field, in order to improve security of business transactions and user-friendliness, it is widely adopted to make payments in advance by using prepaid cards. For example, prepaid card companies issue prepaid cards that are specified to be equivalent to 500 Yen, 1000 Yen, 3000 Yen, respectively, and users purchase these prepaid cards of a desired amount of money. The prepaid cards, for example, are made to be exclusively used to pay for phone calls. In order to pay for phone charges using a prepaid card, a user accesses a prepaid card management system first, and following the guidance, for example, the user operates keys on the keyboard of a cellular phone to input the card number printed on the prepaid card, and to connect to the management system. Receiving the connection request from the user, the management system first authenticates the prepaid card. Then depending on the type of the prepaid card, the management system appropriately calculates the phone charges of a relevant communication terminal, for example, a cellular phone, or a wire line telephone.

Such a prepaid system has been disclosed, for example, in Japanese Unexamined Patent Publication No. 2001-325541. Such a system is not limited to payment of phone charges, but also applicable to normal electronic business transactions.

To utilize the prepaid system of the related art, however, users have to go to special shops to buy the tangible prepaid cards, and this is not convenient to the users. Further, this also imposes a great load on card companies and management systems. In addition, when using the prepaid cards, users have to operate keys one by one to input card numbers, each of which usually has more than 10 digits, and this is often quite cumbersome. Moreover, if input errors occur, the management system has to cope with them, and this increases the burden of the management system. As described here, a prepaid system of the related art is not able to really lighten work loads of users and the system managers.

In addition, in the prepaid system of the related art, the total amount of money in a prepaid card is charged once, so a prepaid card can be used only once. In other words, the money in a prepaid card cannot be partially used, hence cannot be used for several times to make several payments. For example, when paying for telephone charges with a 1000 Yen prepaid card, the 1000 Yen is charged once. As a result, prepaid cards having a larger amount of money are inconvenient compared with prepaid cards having a smaller amount of money. Further, a user of a telephone can only pay for telephone rate of the user himself, that is, when keys of a telephone are operated to input card numbers following the voice guidance, telephone charges of that very telephone are paid. So, payments made from other telephone sets are not allowed. Therefore, even though such prepaid cards are presented to a person, without complicated operation this person cannot use the cards to pay for phone charges for himself. Due to the above reasons, the prepaid cards each having a large amount of money (below, abbreviated as "high-amount prepaid card") are seldom used, while those cards each having a small amount of money (below, abbreviated as "low-amount prepaid card") are relatively prevalent.

Nevertheless, it is quite bothersome for users to buy appropriate prepaid cards according to the actual charges each time, and it is not desirable either for the card company to issue a large number of low-amount prepaid cards. Therefore, the burdens of both the users and the management system are not reduced presently.

SUMMARY OF THE INVENTION

Accordingly, it is a general object of the present invention to solve the above problems of the related art by providing a prepaid system, a prepaid charge management server, a prepaid charge device, a user data base, a communication terminal and methods thereof able to reduce inconvenience caused by issuance and usage of a large number of prepaid cards.

A first specific object of the present invention is to provide a prepaid system, a prepaid charge management server, a communication terminal and a method thereof able to make good use of the advantages of prepaid cards without issuing tangible prepaid cards.

A second specific object of the present invention is to provide a prepaid system, a prepaid charge device, a user data base, and a prepaid method enabling fractional payment, able to improve convenience of prepaid cards having a large amount of money and reduce the amount of issued prepaid cards.

A third specific object of the present invention is to provide a prepaid system, a prepaid charge device, a user data base, and a prepaid method enabling payment from other users, able to improve convenience of prepaid cards having a large amount of money and reduce the amount of issued prepaid cards.

A fourth specific object of the present invention is to provide a prepaid system, a prepaid charge management server, a prepaid charge device, a user data base, a communication terminal and methods thereof enabling more choices of usage by including a function of a communication count of a prepaid card, able to improve convenience of prepaid cards having a large amount of money and reduce inconvenience caused by issuance and usage of a large number of prepaid cards.

To attain the above object, according to a first aspect of the present invention, there is provided a prepaid system, comprising a prepaid deposit management unit configured to manage a deposit of a communication terminal, a prepaid number management unit configured to provide a prepaid number for the prepaid deposit management unit, a prepaid charge unit configured to authenticate the prepaid number, and a charge system configured to charge for a communication made by the communication terminal, wherein the prepaid number management unit transmits a prepaid number related to a predetermined amount of money to the communication terminal through the prepaid deposit management unit in response to a request of the communication terminal when the deposit of the communication terminal is greater than the predetermined amount of money, and subtracts the predetermined amount of money from the deposit of the communication terminal, and the prepaid number is sent from the communication terminal to the charge system through the prepaid charge unit to pay for a communication charge of the communication terminal by using the predetermined amount of money related to the prepaid number.

According to the first aspect of the present invention, it is possible to pay for, for example, telephone charges, by means of prepayment without issuing tangible prepaid cards. Therefore, users do not need to go to special shops to buy the tangible prepaid cards, and this also reduces work load of card companies and management systems of issuing and managing these tangible prepaid cards.

For example, using telephone numbers as unique identification numbers of telephones, it is possible to assign prepaid numbers to communication terminals having enough deposits. Moreover, telephone numbers that the prepaid deposit. management server needs to know are able to be obtained without any special operation when a communication terminal is accessing the prepaid deposit management server.

Furthermore, when accessing the prepaid charge unit, for example, using a URL as its location data, the prepaid number can be sent to the prepaid charge unit together with the URL, so the prepaid charge unit can obtain the prepaid number automatically. As a result, there is no need to input the prepaid number one digit by one digit.

Furthermore, not only the communication terminal that requested the prepaid number, but also any other communication terminal can make use of prepaid numbers for payments.

To attain the above object, according to a second aspect of the present invention, there is provided a prepaid system comprising a user data base storing a plurality of identification numbers of a plurality of communication terminals, and a plurality of prepaid counts each being convertible into a communication charge, each of said identification numbers being made in correspondence with one of said prepaid counts, a prepaid charge unit configured to modify a value of a prepaid count in the user data base, and a first charge system configured to calculate a communication charge of a communication terminal and request the communication terminal to pay for the communication charge, wherein the prepaid charge unit modifies a value of a prepaid count of a first communication terminal when the first communication terminal requests to assign at least a part of the prepaid count of the first communication terminal to a second communication terminal specified by the first communication terminal, the first charge system decreases a communication charge of the second communication terminal by subtracting said at least a part of the prepaid count from the communication charge of the second communication terminal when requested by the prepaid charge unit.

According to the second aspect of the present invention, for example, it becomes possible to pay for telephone charges using the total or a part of the prepaid counts of oneself. Further, it also becomes possible to transfer the total or a part of the prepaid counts to other persons. Therefore, it is possible to greatly improve the convenience of prepaid cards, especially those high-amount prepaid cards, and reduce cumbersome activity resulting from issuing, distributing and buying a large number of low-amount prepaid cards.

Because the prepaid number is assigned electronically, fractional payment for oneself or others is possible, and cumbersome activity resulting from usage of tangible prepaid cards is reduced.

The data in the user data base are modified only after the specified user makes a response to a request, so security of the service can be ensured because the intention of a user is confirmed.

Preferably, the above prepaid system further comprises a second charge system configured to charge for a communication of a communication terminal based on a communication count set in advance, said communication count decreasing along with duration of the communication made by the communication terminal, wherein the second charge system increases a communication count of the second communication terminal by assigning at least a part of the prepaid count of the first communication terminal to the communication count of the second communication terminal when requested by the prepaid charge unit.

Preferably, in the above prepaid system, the user data base further stores payment methods of said communication terminals, and the payment methods includes a first payment method by using the first charge system, and a second payment method by using the second charge system.

According to the above invention, service can be provided for not only common communication terminals utilizing a charge system which charges telephone charges after calls, but also prepayment-only communication terminals utilizing a charge system which charges based on prepayments. Therefore, users have more choices, and the convenience of high-amount prepaid cards is further improved.

Further, it is possible to assign a common group number to a plurality of communication terminals, instead of setting individual phone numbers for each communication terminals; therefore, all the communication terminals belonging to the group can be specified for payment at one time, making the setting of the targets and source easier. Moreover, one communication terminal may also belong to many groups.

In addition, accessing the user data base, the prepaid charge device is able to find the payment method of a communication terminal, for example, the payment method can be included into a contract, and so it is possible to include a number of communication terminals using different payment methods into the same group. As a result, prepaid counts may be assigned to a large variety of users at one time, greatly improving the convenience of prepaid counts.

Furthermore, the prepaid charge device is able to select an appropriate charge system (a prepayment charge system, or a payment on request charge system) automatically, so prepaid counts can be assigned without knowing how a communication terminal is paying.

In addition, there are provided more choices for a user to use his own prepaid counts, such as, assign all or a part of prepaid counts, specify a number of destinations of assignment individually, or specify a number of destinations of assignment as one group, and so on. Because a large amount of prepaid counts needs a large variety of means to use, the present invention is helpful in improving the convenience of the high-amount prepaid cards. In addition, it is advantageous for the prepaid system to purchase the high-amount prepaid cards and use a large amount of prepaid counts, so the cumbersome activity of issuing and using a large number of low-amount prepaid cards is reduced.

These and other objects, features, and advantages of the present invention will become more apparent from the following detailed description of the preferred embodiments given with reference to the accompanying drawings.

BRIEF DESCRIPTION OF THE DRAWINGS

FIG. 2 is a table showing an example of data stored in the deposit data base 108 shown in FIG. 1;

FIG. 3 is a table showing an example of data stored in the prepaid number data base 116 shown in FIG. 1;

FIG. 7 is a table showing an example of data managed in the user data base;

FIG. 8 is a table showing an example of data managed in the user data base continued from FIG. 7;

FIG. 9 is a table showing an example of data managed in the user data base continued from FIG. 8;

FIG. 10 is a table showing an example of data managed in the user data base continued from FIG. 9;

FIG. 11 is a table showing an example of data managed in the user data base continued from FIG. 10;

FIG. 14 is a table showing an example of data managed in the user data base;

FIG. 15 is a table showing an example of data managed in the user data base;

FIG. 16 is a table showing an example of data managed in the user data base;

FIG. 17 is a table showing an example of data managed in the user data base;

FIG. 18 is a table showing an example of data managed in the user data base;

FIG. 19 is a table showing an example of data managed in the user data base;

FIG. 20 is a table showing an example of data managed in the user data base;

FIG. 21 is a table showing an example of data managed in the user data base;

FIG. 22 is a table showing an example of data managed in the user data base;

FIG. 23 is a table showing an example of data managed in the user data base;

FIG. 24 is a table showing an example of data managed in the user data base;

FIG. 25 is a table showing an example of data managed in the user data base;

FIG. 26 is a table showing an example of data managed in the user data base;

FIG. 27 is a table showing an example of data managed in the user data base;

FIG. 28 is a table showing an example of data managed in the user data base;

FIG. 29 is a table showing an example of data managed in the user data base;

FIG. 30 is a table showing an example of data managed in the user data base;

FIG. 31 is a table showing an example of data managed in the user data base;

FIG. 32 is a table showing an example of data managed in the user data base;

FIG. 33 is a table showing an example of data managed in the user data base;

FIG. 34 is a table showing an example of data managed in the user data base;

FIG. 35 is a table showing an example of data managed in the user data base;

DESCRIPTION OF THE PREFERRED EMBODIMENTS

Below, preferred embodiments of the present invention will be explained with reference to the accompanying drawings.

The First Embodiment

Figure 1:
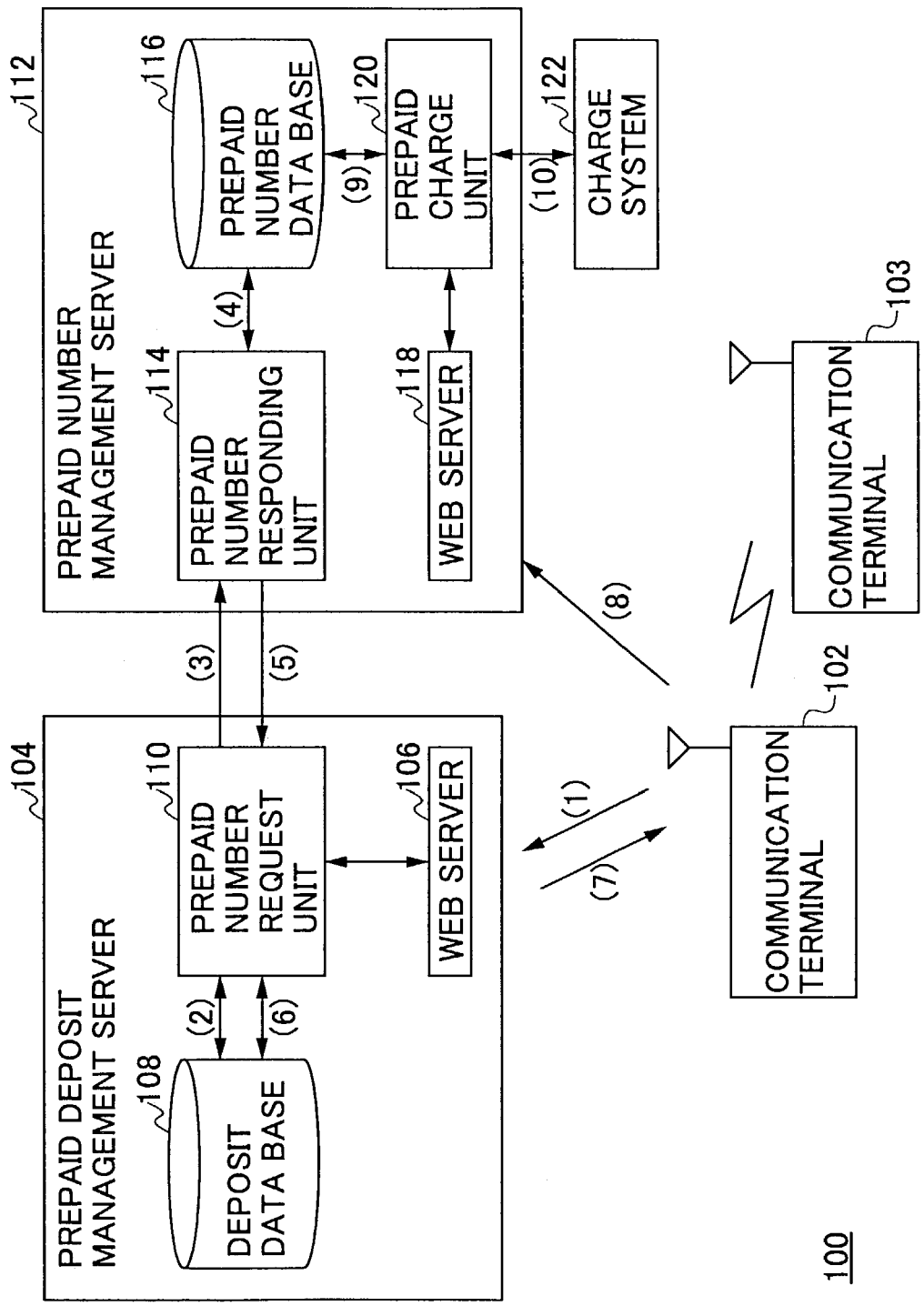
FIG. 1 is a block diagram showing a prepaid system according to a first embodiment of the present invention.

FIG. 1 is a block diagram showing a prepaid system 100 according to a first embodiment of the present invention.

The prepaid system 100 includes a communication terminal 102 capable of communication through radio links or cables, a prepaid deposit management server 104 for managing a predetermined amount of money deposited in advance for payment of telephone charges of the communication terminal 102, a prepaid number management server 112 for managing assignment of prepaid numbers as described below, and a charge system 122 for calculating telephone charges that should be paid by the user of the communication terminal 102.

In the following description, it is assumed that the communication terminal 102 has a unique phone number (or identification number), and is capable of mobile communication. As a typical example, it is a cellular phone for mobile communication. The prepaid deposit management server 104 includes a web server 106 functioning as an interface for radio communication with the communication terminal 102, a deposit data base 108 storing data of the amount of the deposited money for communication terminals, and a prepaid number request unit 110 connected with the deposit data base 108 and the web server 106.

The deposit data base 108 stores data of the amount of the deposited money for each phone number. A predetermined amount of money may be deposited to the deposit data base 108 by directly accessing the deposit data base 108 or through bank accounts, convenience stores or others places.

FIG. 2 is a table showing an example of data stored in the deposit data base 108 in FIG. 1.

The left column of the table in FIG. 2 shows communication terminals which request provision of prepaid numbers by using the prepaid system 100. The central column shows the phone numbers of the communication terminals in the left column, and the right column shows the amount of the deposited money that will be used for payment, or the remaining amount of money that can be used for payment. For example, the phone number of the communication terminal 1 is TEL_1, and the remaining amount of money is BL_1. Therefore, for each of the subscribers (communication terminals) which are able to use the prepaid system 100, at least its phone number and the deposit are managed in the deposit data base 108. Note that the table in FIG. 2 is just an example, other necessary information besides the phone numbers and the deposit, for example, passwords, names, or others, may also be included in the table in FIG. 2. Further, in FIG. 2, the deposit is managed in terms of amount of money directly, but it can also be managed in terms of call units (or points, or counts) that can be converted to telephone rates.

Returning to FIG. 1, the prepaid number management server 112 in the prepaid system 100 includes a prepaid number responding unit 114 that is operated to respond to requests from the prepaid deposit management server 104, a prepaid number data base 116 storing prepaid numbers, a web server 118 functioning as an interface of radio communication with the communication terminal 102, and a prepaid charge unit 120 connected with the prepaid number data base 116 and the web server 118. The prepaid charge unit 120 is further connected with a charge system 122.

Next, the operation of the prepaid system 100 is explained.

First, a not shown center for issuing prepaid numbers provides prepaid numbers to the prepaid number management server 112, and the prepaid number is stored in the prepaid number data base 116. For example, this center for issuing prepaid numbers may be a card company that provides the conventional tangible prepaid card, or any organization otherwise able to provide the prepaid numbers described below.

FIG. 3 is a table showing an example of data stored in the prepaid number data base 116 in FIG. 1. The leftmost column of the table in FIG. 3 shows types of prepaid numbers presented in the second column from the left. There are three kinds of prepaid numbers specified to be equivalent to amount of money of, for example, 500 Yen, 1000 Yen, and 3000 Yen, respectively. For example, the 500-Yen prepaid number is specified as "P type", and P type prepaid numbers "NUM_P_A", "NUM_P_B", "NUM_P_C", and so on are stored in the prepaid number data base 116. Similarly, there are also "Q type" prepaid numbers corresponding to amount of money of 1000-Yen, or 3000-Yen, and the Q type prepaid numbers "NUM_Q_A", "NUM_Q_B", "NUM_Q_C", and so on are also stored in the prepaid number data base 116. The rightmost column shows status of the corresponding prepaid numbers, for example, status data "not paid", "paid", "not used", "used", "expired" are shown in FIG. 3, and usage of prepaid numbers are controlled according to the status data.

Here, the status data "not paid" indicates that a prepaid number has not been assigned to a communication terminal. The status data "paid" indicates that a prepaid number has been assigned to a communication terminal. The status data "not used" indicates that an assigned prepaid number has not been used for payment yet. The status data "used" indicates that an assigned prepaid number has already been used for payment at least once. The status data "expired" indicates that the valid period of the provided prepaid number has expired, and use of this number is forbidden.

Figure 4:
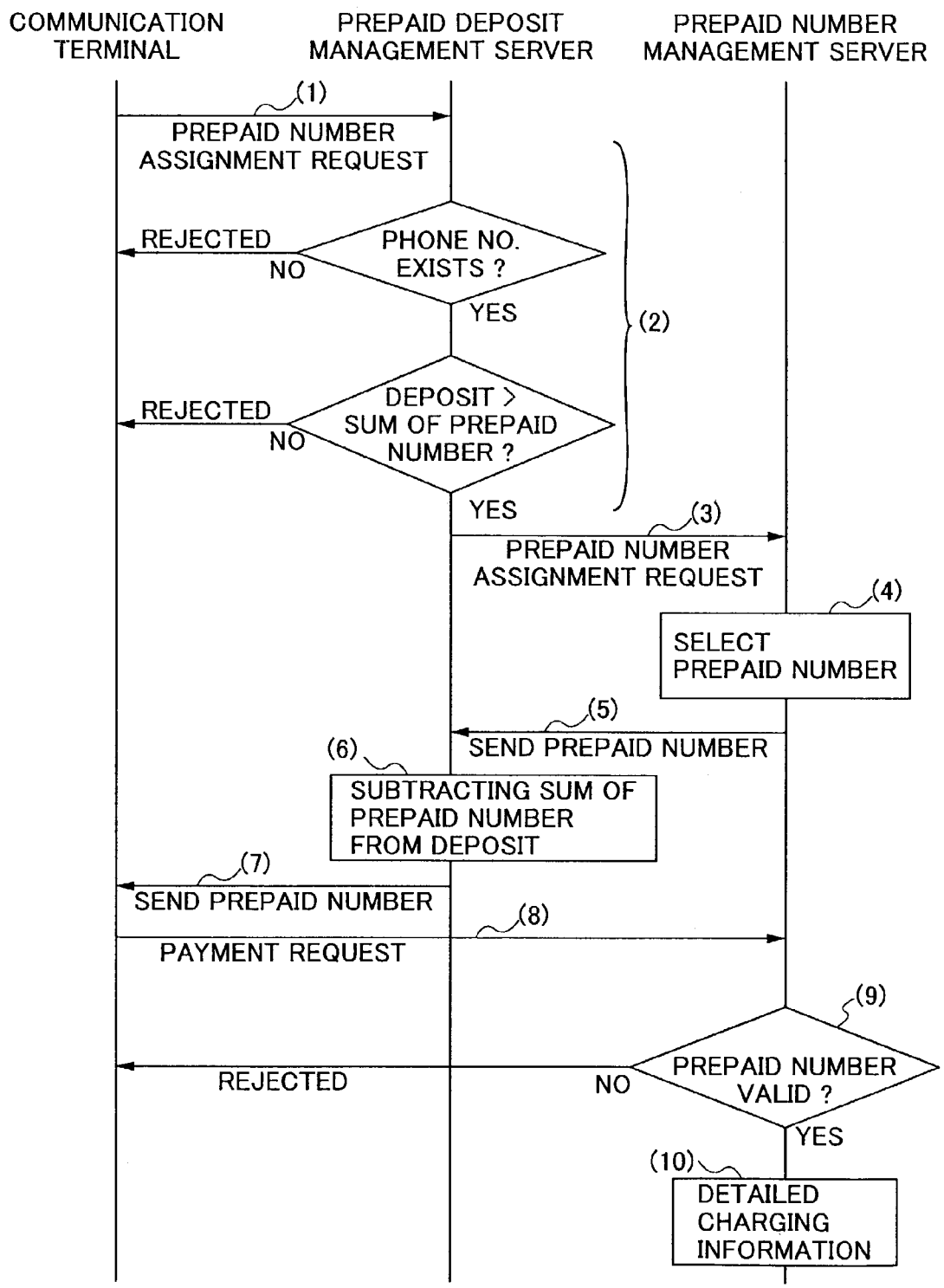
FIG. 4 is a flow chart showing the operation of the prepaid system according to the first embodiment.

FIG. 4 is a flow chart showing the operation of the prepaid system 100. Note that the numeral reference numbers (1) through (10) that show steps in FIG. 4 are also indicated in FIG. 1.

In step (1), the communication terminal 102 requests the prepaid deposit management server 104 to assign a prepaid number. In this request, at least the desired type of the prepaid number is specified. This request is transmitted to the prepaid number request unit 110 through the web server 106 together with the phone number of the communication terminal 102. When the communication terminal 102 accesses the web server 106, the web server 106 is able to obtain the phone number of the communication terminal 102, so additional operation for inputting the phone number of the communication terminal 102 is not necessary.

In step (2), the prepaid number request unit 110 that received the request for assigning a prepaid number accesses the deposit data base 108 and confirms whether or not the phone number of the communication terminal 102 are in the deposit data base 108, that is, confirms if phone charges of the communication terminal 102 is allowed to be paid through the Internet. Furthermore, it is also confirmed if the amount of money deposited in advance in the deposit data base 108 for payment of the communication terminal 102 is greater than the amount of money of the specified type of the prepaid number. In order to obtain a prepaid number, a certain amount of money should be paid from the deposit in the deposit data base 108, so the deposit in the deposit data base 108 should be greater than the amount of money of the specified type of the prepaid number.

In case either or both of the above two conditions are not satisfied, the request for assigning a prepaid number is rejected, and this decision is provided to the communication terminal 102.

In case both of the above two conditions are satisfied, the request of assigning a prepaid number is accepted, and the routine proceeds to step (3).

In step (3), the prepaid number request unit 110 further requests the prepaid number management server 112 to assign the prepaid number that is requested by the communication terminal 102.

In step (4), the prepaid number responding unit 114 receives the request from the prepaid number request unit 110. Making reference with the prepaid number data base 116, the prepaid number responding unit 114 selects a prepaid number corresponding to the specified prepaid number type of status data "not assigned" and "not used". For example, in FIG. 3, if the prepaid number type is P, the prepaid number NUM_P_A is usable, and if the prepaid number type is Q, the prepaid number NUM_Q_B is usable. In case a number of prepaid numbers are usable, one prepaid number is selected from them. The prepaid number can be selected by any method, for example, it can be selected in sequence from the smaller prepaid number, or it can be selected randomly. The status of the selected prepaid number is modified to be "assigned" from "not assigned". Note that the status "not used" remains unchanged.

In step (5), the prepaid number responding unit 114 sends the selected prepaid number to the prepaid deposit management server 104.

In step (6), the prepaid number request unit 110 accesses the deposit data base 108, and subtracts the amount of money of the specified prepaid number type from the deposit of the communication terminal 102. Then, the amount of money after the subtraction, the date, and the type of prepaid number are recorded or updated when necessary.

In step (7), the prepaid number request unit 110 transmits the prepaid number received from prepaid number management server 112 to the communication terminal 102 through the web server 106. In this case, the prepaid number is sent together with the URL of the prepaid charge unit 120. Specifically, it is set that when the communication terminal 102 accesses the web using the URL, the page related to the assigned prepaid number is presented. This can be achieved by setting the prepaid number into option parameters of the URL.

In step (8), if payment using the prepaid number is intended, the communication terminal 102 accesses the web server 118 by using the above URL. Since information of the prepaid number is included in the URL as described above, the communication terminal 102 is able to open the web page related to the prepaid number without inputting the prepaid number one digit by one digit by hand, and to pay for telephone charges using the amount of money determined by the type of the assigned prepaid number. Since input by hand is not needed, mistaken input of the number becomes less probable, and the work load of treating the mistaken input is reduced.

In step (9), the prepaid charge unit 120 that is accessed by the communication terminal 102 confirms the validity of the prepaid number. Specifically, the prepaid charge unit 120 confirms if the status data of the prepaid number provided through the web server 118 are "assigned" and "not used". If they are not, usage of the prepaid number for payment is rejected, and this decision is provided to the communication terminal 102. If the status data of the prepaid number are "assigned" and "not used", the routine proceeds to step (10) for calculation of telephone charges.

In step (10), when the validity of the prepaid number is confirmed, the prepaid charge unit 120 sends to the charge system 122 data of charges of phone calls, duration, date and time of phone calls, telephone number, and other detailed information necessary to calculation of telephone charges. The charge system 122 calculates the telephone charges of the communication terminal 102 based on these pieces of information, and requests the user of the communication terminal 102 to pay for it. Specifically, the amount of money related to the prepaid number, which is determined by the prepaid number type, is subtracted from the sum of telephone charges of the communication terminal 102. In this way, the money deposited in advance in the deposit data base 108 is used for payment for telephone charges. After that, the status data of the prepaid number are modified to "assigned" and "used".

Note that when the prepaid number is authenticated, it may also be confirmed that the status is not "expired".

According to the first embodiment, instead of issuing conventional tangible prepaid cards, prepaid numbers are provided, which are equivalent to numbers of the tangible prepaid cards. By accessing a web page related to a prepaid number, it is possible to pay for telephone charges with an amount of money related to this prepaid number. Since the conventional tangible prepaid cards are not issued, the cumbersome activity of issuing, purchasing and carrying prepaid cards is eliminated, and this is beneficial to both users and system managers.

Further, deposits in the deposit data base 108 are managed based on phone numbers. Each phone number is uniquely assigned to each communication terminal, so when accessing the prepaid number request unit 110 through the web server 106, the prepaid number request unit 110 automatically obtains the phone number, and a request for assigning a prepaid number by using the deposit managed in the deposit data base 108 is possible only for a communication terminal of this phone number. In addition, the user of the communication terminal 102 needs not input the phone number by hand. Further, it is difficult for other communication terminals to make fake requests in the name of the communication terminal 102. In this respect, the present embodiment has an advantage over methods of the related arts involving managing deposit by using identification labels such as user names, passwords, or others. Therefore, according tithe present embodiment, it is possible to simply achieve safe requests for prepaid number assignments.

In the present embodiment, instead of issuing conventional tangible prepaid cards, prepaid numbers are provided. Just like a scratch card, it is easy to know whether a tangible prepaid card is being used or not, and unused cards may possibly be cashed in shops, so a tangible prepaid card may be stolen or misused. In contrast, a prepaid number as disclosed in the present embodiment is electronic data used only for paying for phone charges, even though the number is known by other persons, it is not possible to cash it as done with a tangible card. So the present embodiment is advantageous in the respect of discouraging theft and misuse.

In the present embodiment, it is explained above that the communication terminal 102 that requests for a prepaid number assignment uses the prepaid number to pay for its telephone charges, but the present invention is not limited to this kind of application. The URL including a prepaid number can also be transmitted to another communication terminal 103 as shown in FIG. 1. Then, the communication terminal 103 is able to access a web page related to the prepaid number, and further to pay for telephone charges of the communication terminal 103 using the prepaid number. In addition, the communication terminal 103 can also transmit the URL including the prepaid number to still another communication terminal, and the still another communication terminal is able to pay for telephone charges for itself by using the prepaid number. In other words, a phone number of a user and a prepaid number are sufficient in order to use a prepaid number for a payment for the user, because with the phone number of the user and a prepaid number, it is possible to perform authentication of the prepaid number, and notification of the sum of telephone charges to a charging system. Note that the phone number of the communication terminal 102 that made the request for assigning a prepaid number is not necessary.

In the above description, the prepaid deposit management server 104 and the prepaid number management server 112 are illustrated by two different function blocks. However, this is just a functional description, and actually they may be formed integrally in hardware.

Nevertheless, on one hand, the prepaid deposit management server 104 has many functions, for example, it confirms if a communication terminal that requests assignment of a prepaid number possesses a bank account based on the phone number of the communication terminal, and it receives and transmits signals for assigning the prepaid number, and transmits a URL including the prepaid number to the communication terminal. On the other hand, the prepaid number management server 112 supplies a prepaid number, confirms the validity of the prepaid number based on its status data, and supplied information necessary to the charge system 122. Because the functions and services supplied of the two parts are quite different, it is preferable to form them separately rather than integrally in the respect of security of the system.

In the present embodiment, payment for telephone charges is made as an example in the above explanations, but the present embodiment is not limited to this; it is applicable to any system in which the target of payment is fixed in advance. However, by the present embodiment, input operation of telephone numbers and prepaid numbers one digit by one digit is not necessary, and the deposit is managed in the deposit data base in terms of phone numbers, so manual input operation of users is reduced, therefore it is preferable to apply the present embodiment to payments for telephone charges associated with specific phone numbers.

The Second Embodiment

Figure 5:
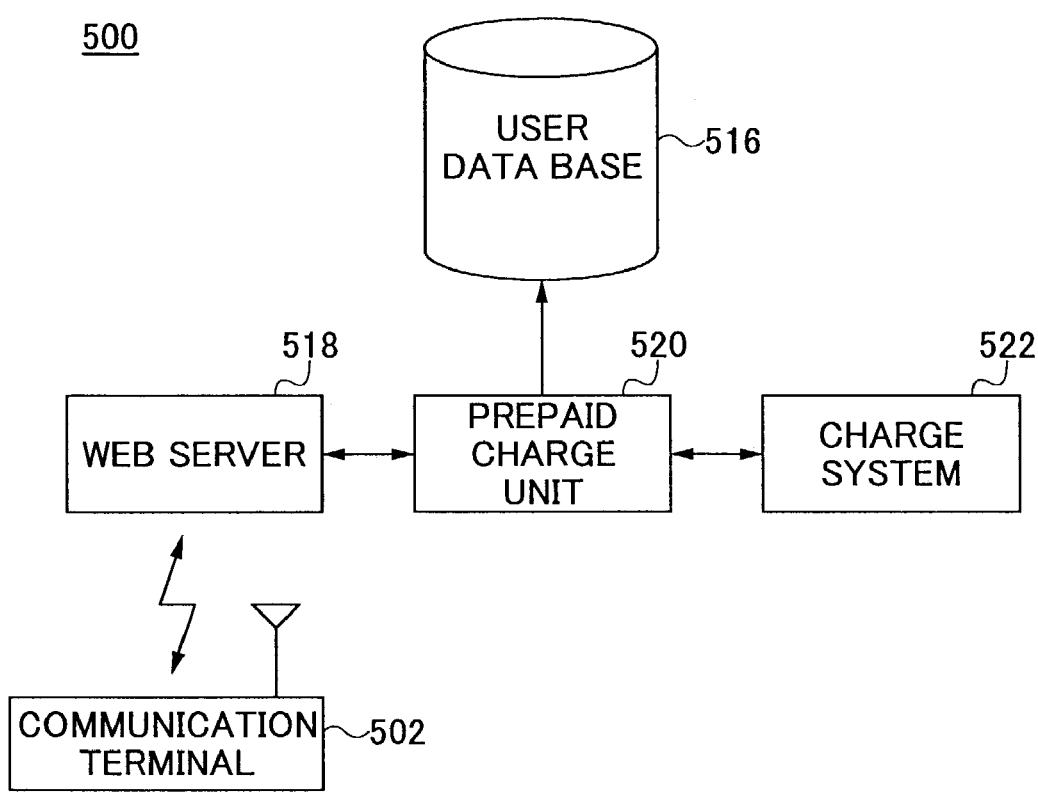
FIG. 5 is a block diagram showing a prepaid system according to a second embodiment of the present invention.

FIG. 5 is a block diagram showing a prepaid system 500 according to a second embodiment of the present invention.

The prepaid system 500 includes a communication terminal 502 capable of communication through radio links or cables, a prepaid charge unit 520 capable of being accessed by the communication terminal 502, and a user data base 516 capable of being accessed by the prepaid charge unit 520 when necessary. In this embodiment, it is assumed that the communication terminal 502 is a cellular phone. Further, the prepaid charge unit 520 is also connected with a charge system 522 for requesting payments of telephone charges of the communication terminal 502. The charge system 522 calculates telephone charges that the communication terminal 502 will be requested to pay based on information of duration and content of phone calls of the communication terminal 502. In this embodiment, the communication terminal 502 is able to access the prepaid charge unit 520 through the web server 518 functioning as a user interface.

As described below, the prepaid charge unit 520 remits a part of its prepaid counts to other communication terminals or transfers a part of its prepaid counts to other communication terminals. The user data base 516 stores identification numbers of communication terminals, and information for managing prepaid counts registered in advance according to identification numbers. For example, telephone numbers of cellular phones may be used as identification numbers of communication terminals.

A prepaid count (or prepaid units) represents a count set in advance capable of being used to pay for telephone charges of a communication terminal by its user. This count may be made in direct correspondence with a telephone charge, or it may also be converted into a telephone charge according to predetermined regulations. In this embodiment, for the sake of simplicity, it is assumed that one count is equivalent to one Yen.

In the first embodiment, instead of issuing tangible prepaid cards, prepaid numbers are provided to allowing usage of a certain amount of money. The prepaid count in the present embodiment may be based on the conventional tangible prepaid cards, or on the prepaid number electronically assigned in the first embodiment. In the present embodiment, it is enough if the prepaid count can be managed by the user data base 16; it does not matter where the prepaid count comes from.

Figure 6:
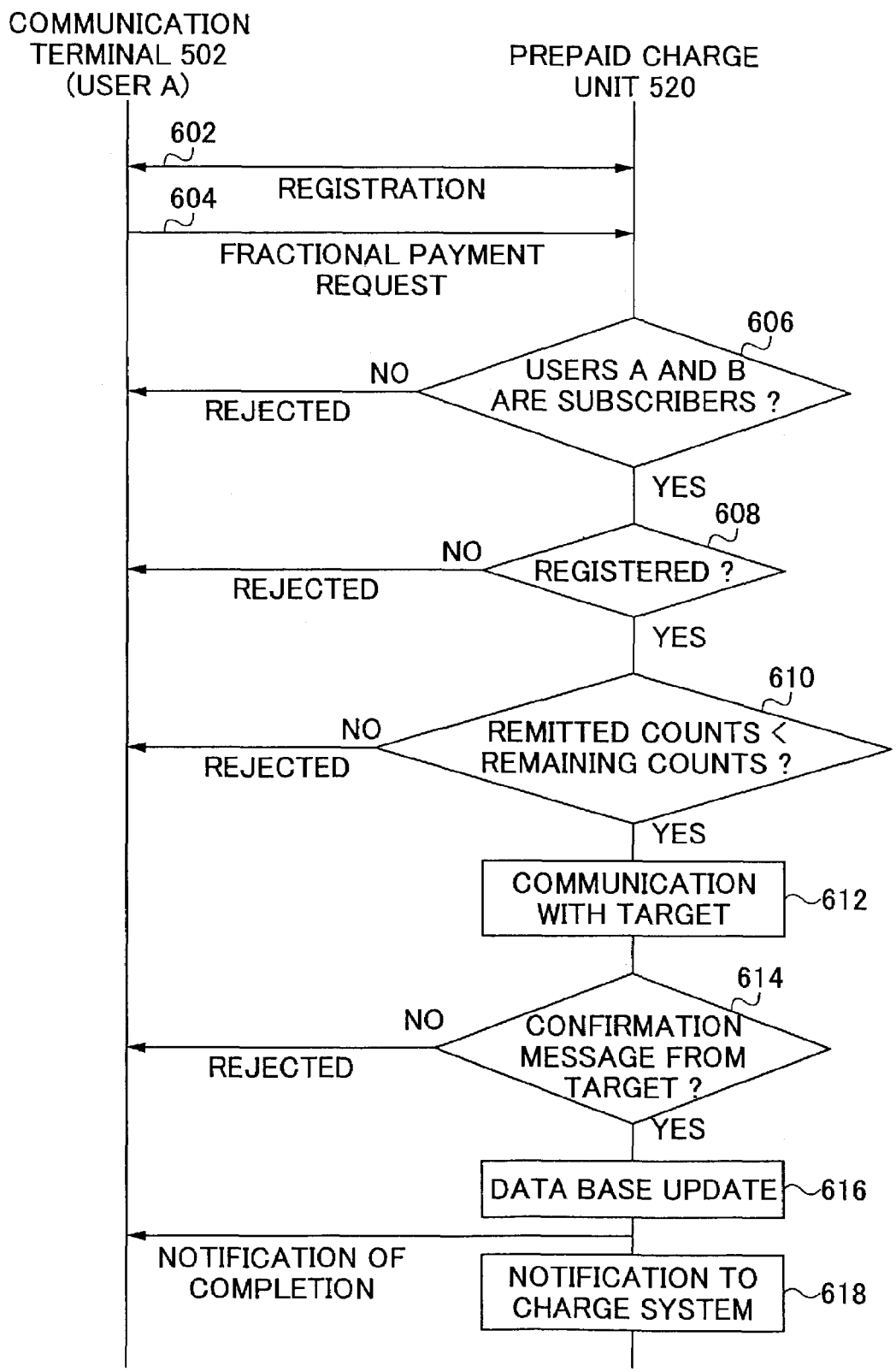
FIG. 6 is a flow chart showing the operation of the prepaid system according to the second embodiment.

FIG. 6 is a flow chart showing the operation of the prepaid system 500. This operation may be associated with the step (8), step (9) and step (10) in the flow chart in FIG. 4 about a payment request, authentication of a prepaid number, and notification to the charge system, respectively. Below, operation of a fractional payment will be explained with reference to FIG. 5 and FIG. 6.

First, in step 602, registration is performed. In detail, a user A having a tangible prepaid card uses his communication terminal 502 to access the prepaid charge unit 520 via the web server 518. User A supplies information about himself, for example, his phone number, and a prepaid card number recorded in his prepaid card. For example, user A supplies these pieces of information by operating keys on the keyboard of the communication terminal 502. Based on these pieces of information, the prepaid charge unit 520, which corresponds to the prepaid charge device of the present invention, confirms whether user A (or communication terminal 502) is allowed to utilize the fractional remittance service related to the present embodiment. If not, user A (or communication terminal 502) is rejected, and cannot receive the service related to the present embodiment.

FIG. 7 shows an example of data managed in the user data base 516 for detailed explanations. As shown in FIG. 7, if the prepaid charge unit 520 confirms that user A (or communication terminal 502) is allowed to utilize the service related to the present embodiment, the counts associated with the type of the prepaid card (for example, 10000 counts) is registered in the user data base 516 in correspondence with the identification number of the communication terminal of user A. In the table in FIG. 7, "remaining counts" represents the available counts, and in this example, a value worth of 10000 Yen is recorded in this column, and this amount of counts (money) can be used to pay for telephone rates.

User A can use all or a part of the remaining counts to pay for his telephone charges, or he can remit all or a part of his remaining counts to pay for telephone charges for other users, or he can also transfer all or a part of the remaining counts to other users.

Below, payment made using a part of remaining counts is referred to as "fractional payment". As described below, this term also include "fractional remittance" or "fractional transfer", for uniformity, the term "fractional payment" is mainly used.

In the present embodiment, the expression "remit x remaining counts of user A to user B to pay for telephone charges of user B" means that x counts are remitted to user B and are subtracted immediately from a telephone charge, and the result y-x becomes the unpaid telephone charge of user B, and is to be charged later. Such calculations are made in the charge system 522 based on duration and content of phone calls of user B.

The expression "remit the total remaining counts of user A to user B to pay for telephone charges of user B" means that the total counts of user A are subtracted once, just as done in the related art.

The expression "remit a part of the remaining counts of user A to user B to pay for telephone charges of user B" is abbreviated as "fractional remittance", or generally, "fractional payment" as mentioned above, and it means that a part of the total remaining counts of user A is remitted to user B to pay for telephone charges of user B, and the new remaining counts of user A are available for further usage.

In contrast the expression "transfer x counts from user A to user B" means to add x counts of user A to counts of user B, therefore to increase the counts of user B. User B may use the transferred counts to pay for phone charges of himself, or may also transfer total or a part of the counts to other users.

As indicated by the above descriptions, the remaining counts of a user can be used to pay for telephone charges immediately, or can also be moved to other users but not be used for payment immediately. Certainly, counts having been used for a payment cannot be used for "transfer" or other payments.

In this embodiment, it is assumed that user A intends to remit 1000 counts out of his 10000 counts to user B, that is, user A intends to make a fractional remittance, or generally, a fractional payment, for user B.

In step 604, user A transmits a request of remittance. When making this request, user A also provides the prepaid charge unit 520 with other information necessary to this remittance, for example, the counts to be remitted to user B, the remittance target (here, user B), and so on. If a greeting service is used, user A may also provide the prepaid charge unit 520 with information such as a mail address of the mail receiver (here, user B), a message, date and time of sending the greeting mail. With these pieces of information, it is possible to specify sending a notification of the remittance on the specified date and at the specified time. For example, user A may specify a date or time related with private events, or with business; in detail, user A may specify user B, birthday, or designate sending the notification on a specific day, after a certain number of days, immediately, or others.

In steps 606, 608, and 610, the prepaid charge unit 520 makes authentication concerning user A, who made the request of remittance, and user B, who is the party of user A.

In step 606, the prepaid charge unit 520 confirms if user A and user B are subscribers of the service according to the present embodiment.

In step 608, the prepaid charge unit 520 confirms if user A has performed the registration as described in step 602.

In step 610, the prepaid charge unit 520 confirms if the counts to be charged are less than the remaining counts.

In case the answer of any of the above confirmations is No, the remittance request of user A is cancelled, and this decision is provided to user A. Note that the confirmation needed to be made is not limited to the above items; when necessary, new items may be added or deleted, or replaced, and the order of the confirmation may also be changed appropriately.

Figure 13:
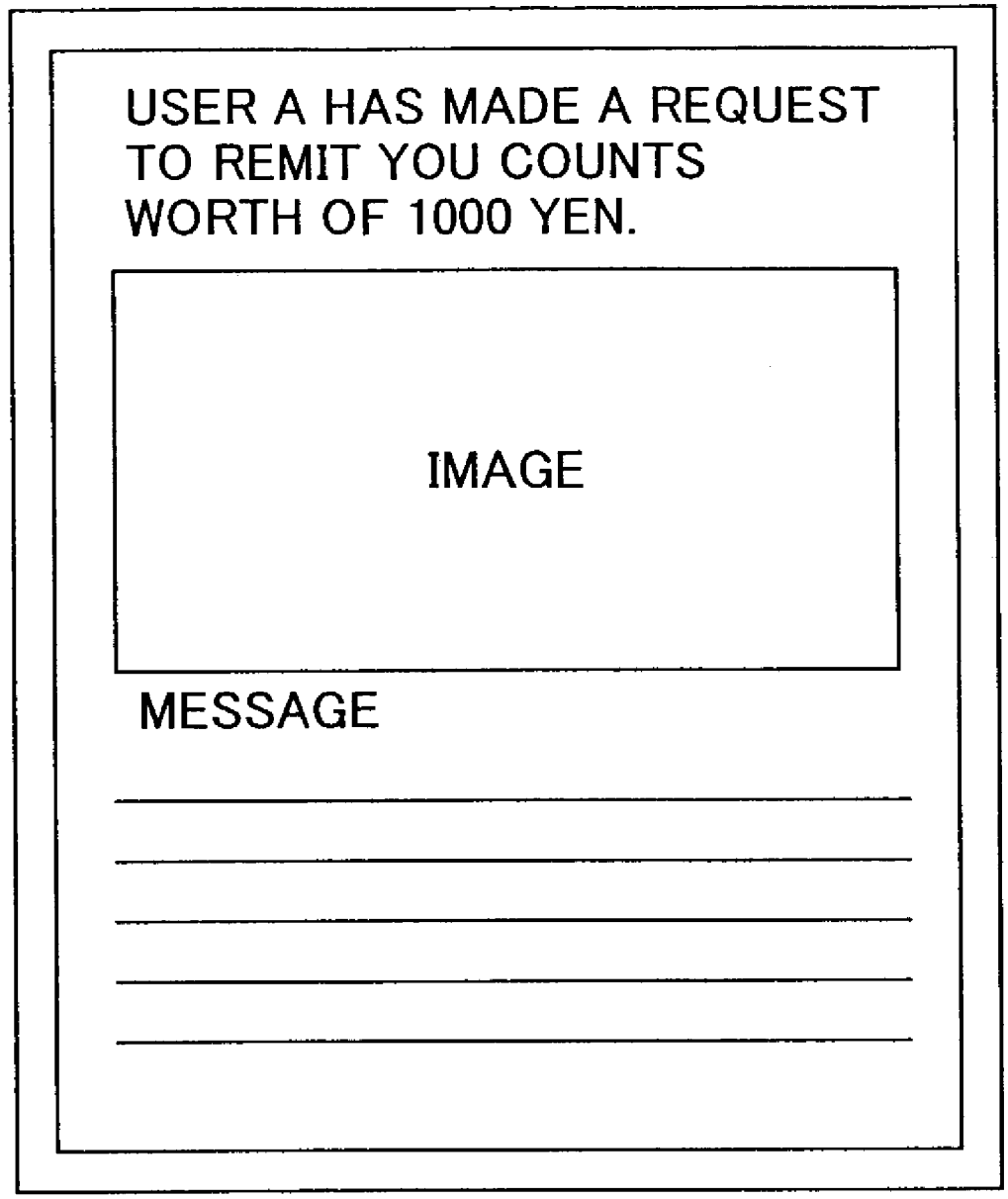
FIG. 13 is a view showing an example of an electronic mail sent to a terminal that should pay.

In step 612, after the above authentication, the prepaid charge unit 520 notifies user B (the target to be paid) that user A has made a request to the prepaid system for remitting an amount of counts to user B. When the greeting service is used, the prepaid charge unit 520 sends this notification to user B on the specified date and at the specified time. This notification may be sent by an electrical mail service available to communication terminals of user A and user B. As shown in FIG. 13, this notification may include information such as user A has made a request of a payment worth of 1000 counts, and user B is required to declare acceptance or rejection of these counts by the specified date and time. In addition, the notification may also include a text message or an image message from user A.

Continued from FIG. 7, FIG. 8 shows an example of data managed in the user data base 516. As shown in FIG. 8, at the present stage of the processing routine, the remaining counts of user A are updated in the user data base 516 by subtracting 1000 counts which is to be remitted. In FIG. 8, the column of "remitted counts" related to user B (that is, the counts remitted from user A) is still zero, because intention confirmation for user B has not been made.

Continued from FIG. 8, FIG. 9 shows an example of data managed in the user data base. FIG. 9 shows the data of states in a period from the time of the notification described in step 612 to the time when intention of user B is confirmed. As shown in FIG. 9, these data are managed in a different way from those in FIG. 8. Specifically, in addition to the remaining counts and the remitted counts managed as shown in FIG. 7 and FIG. 8, the source of remittance (here, user A), the target of remittance (here, user B), and a flag indicating the state of the request are also shown in FIG. 9.

In FIG. 9, the flag in the rightmost column represents whether the remittance request from user A is still valid; for example, it may be set that within a valid period user B should declare his intention, otherwise the request of user A becomes invalid. A flag of "ON" indicates the request is still valid, that is the specified period has not elapsed, while a flag of "OFF" indicates user B did not make a response within the specified period, so the request is now invalid.

Because user A has decided to remit 1000 counts to user B, the 1000 counts to be remitted are subtracted from the original remaining counts. As shown in FIG. 8, after subtracting 1000 counts from the original remaining counts 10000, the new remaining counts of user A become 9000, and this value is recorded in the user data base 516. In contrast, for user B, because his intention of accepting the 1000 counts has not been confirmed, the column of "remitted counts" of user B is still zero. If the intention of user B is not confirmed within the specified valid period, the request of user A is cancelled. So, before intention of user B is confirmed, from the point of view of security of the service, the remitted counts of user B is not updated. Note that update of the remaining counts of user A (from 10000 to 9000) may also be done after intention of user B is confirmed.

In step 614, the prepaid charge unit 520 confirms if a confirmation message is received from the target (that is, user B) within the period. If not, the request of user A is cancelled, the value of the remaining counts of user A is returned to the original 10000, and the routine is finished. If a confirmation message is received within the valid period from the target (user B), after necessary checking steps, charge processing is executed.

The items to be checked may include that, for example, user B is not excluded from the present service by regulation, and the sum of the remitted counts of user B is within a limitation, and so on. For example, if the sum of remitted counts of each month is set below 50000 Yen, it is determined whether the total of the remitted counts so far in the present month is less than 50000 Yen.

In step 616, data of the remaining counts of user A and the remitted counts of user B in the user data base 516 are updated.

Continued from FIG. 9, FIG. 10 shows an example of data managed in the user data base 516. As shown in FIG. 10, 1000 counts are remitted from user A to user B, and the remaining counts of user A become 9000. The user data base 516 is updated accordingly, and a notification is sent to user A that user B accepts the 1000 counts from him.

In step 618, based on the updated data in the user data base 516, the prepaid charge unit 520 notifies the charge system 522 of information of the counts remitted from user A so that the charge system 522 can calculate the telephone charges of user B and request user B to pay for it.

Specifically, the charge system 522 subtracts the remitted counts (strictly speaking, the amount of money equivalent to the remitted counts) from the original telephone charges of user B, and the result of the subtraction is the telephone charge that user B is to be requested to pay for it.

Because users pay for the telephone charges on request after phone calls, the charge system 522 is a "payment on request" charge system.

In this way, in replacement of user B, user A remits an amount of counts to another person user B to pay for the telephone charges of user B. Because payment with counts of other persons is allowed, the convenience of prepaid cards is greatly improved. Of course, user A can also make payments for himself using all or a part of his remaining counts. In this case, the step 612 and 614 described above become simple.

Furthermore, instead of paying for user B with a certain amount of counts of user A as described above, user A may also transfer a part of his remaining counts to user B. In this case, processing related to steps 604 through 616 are roughly the same. That is, in step 604, user A transmits a request of transfer while specifying the target of transfer and the value of the counts to be transferred. In steps 606 through 610, the source and target of transfer are authenticated. In step 612, the target of transfer is notified, and according to the results of confirmation, data in the user data base 516 are updated. When counts are transferred, a payment is not made immediately, so the processing of transfer is finished at step 616 after a completion notification is sent to the source of transfer. After that, user B may use the transferred counts for payments when necessary.

FIG. 11 shows an example of data managed in the user data base 516 for detailed explanations of the above processing.

As shown in FIG. 11, for example, considering a case in which user A intends to transfer 1000 counts to user B, and user B accepts this request, in this case, the value of the remaining counts of user B is recorded to be 1000. So, User B may use the 1000 counts to pay for phone charges of him or others, or may further transfer all or a part of the 1000 counts to other users.

Note that when counts are transferred, data can be updated by electronically modifying the data stored in the use data base 516, so there is no need to issue a new tangible prepaid card to do that. Therefore, according to the present embodiment, if a high-amount prepaid card is purchased, it is not necessary to issue low-amount prepaid cards. Furthermore, as in the first embodiment, if the high-amount prepaid card is also provided electronically, fractional payment or transfer can be made without issuance of any tangible prepaid cards.

According to the second embodiment, it becomes possible to pay for telephone charges using the total as well as a part of the remaining counts of oneself. Further, it also becomes possible to transfer the total or a part of the remaining counts to other persons. Therefore, compared with the method of the related art which allows payment using only the total of the remaining counts, the prepaid system of the present embodiment greatly improves the convenience of prepaid cards, especially those high-amount prepaid cards.

For example, the General Affair Department of a company purchases high-amount prepaid cards, and transfers parts of the prepaid counts of these cards to each department of the company. Using these counts, these departments further remit to pay for phone charges of their staffs. In the related art, in contrast, a large number of low-amount prepaid cards are issued; the General Affair Department of a company purchases a number of these cards and distributes them to other constituent departments of the company to pay for telephone charges of their staffs. The whole process is rather troublesome. Moreover, the sum of the different prepaid cards (500 Yen, 1000 Yen, and 3000 Yen) has to be made to be equal to the telephone charges of the company, this is also quite troublesome.

In contrast, according to the present embodiment, the General Affair Department of the company purchases high-amount prepaid cards representing the company, and transfers parts of the prepaid counts to each of the departments of the company. These departments further remit these counts to their staffs to pay for their phone charges. In this way, payment for the total telephone charges of the company can be easily made. In addition, since the transfer and remittance is performed electronically, the cumbersome activity of issuing and distributing a large number of low-amount prepaid cards is eliminated.

Furthermore, in the prepaid system 500 of the present embodiment, the remaining counts of a user can be increased and decreased. For example, when a user purchased a new prepaid card or a new prepaid number, the user can add the new equivalent counts to his present prepaid counts, that is, to increase his present prepaid counts. Or, when a user accept an amount of counts transferred from other users, the user can also add these counts to his present prepaid counts to increase his present prepaid counts.

In the user data base 516, the identification numbers of users are stored in correspondence with their remaining counts, and the numbers of the prepaid cards are irrelevant; this enables storage and modification of the prepaid counts.

The Third Embodiment

Figure 12:
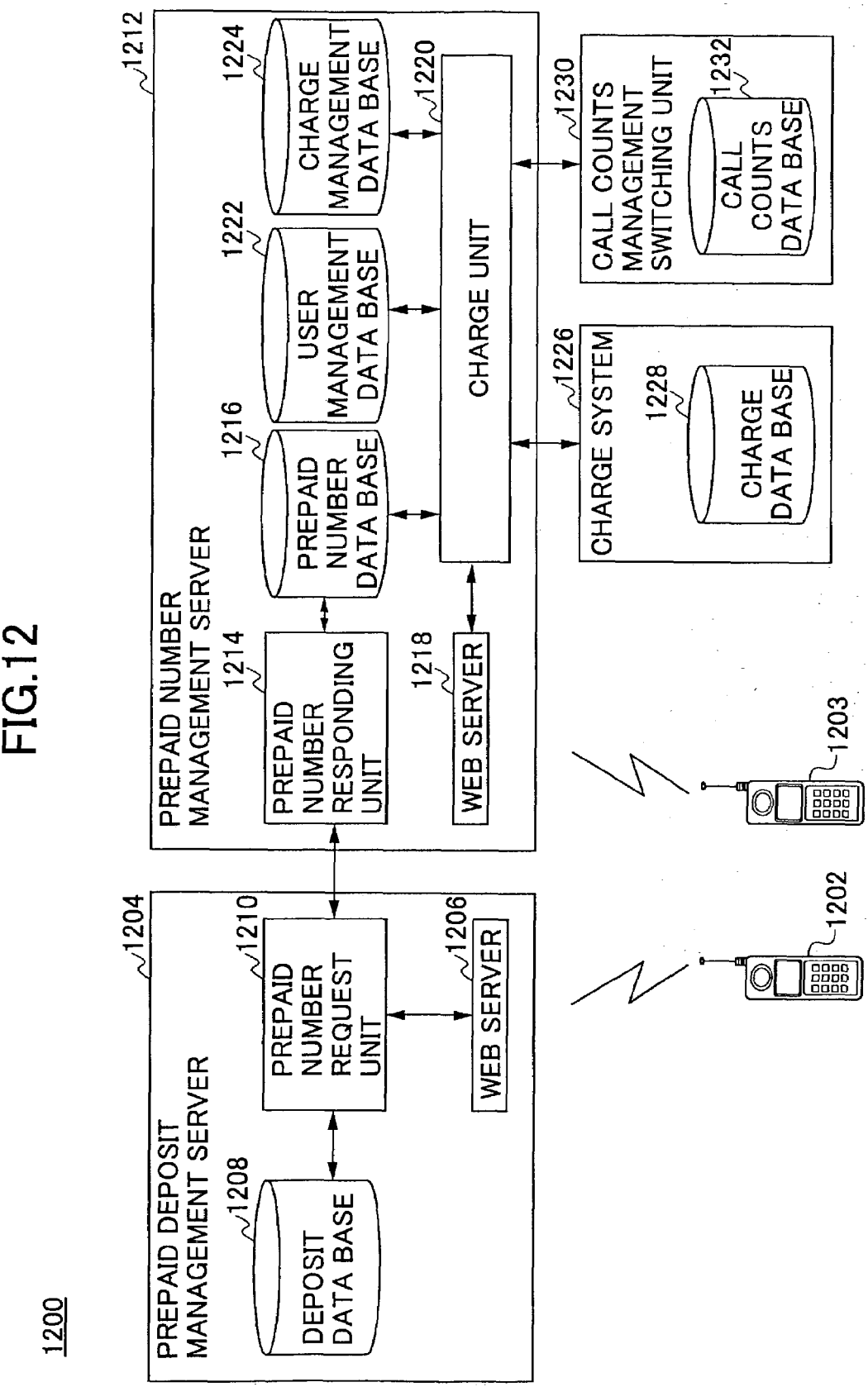
FIG. 12 is a block diagram showing a prepaid system according to a third embodiment of the present invention.

FIG. 12 is a block diagram showing a prepaid system 1200 according to a third embodiment of the present invention.

The same as the prepaid system of the first embodiment, the prepaid system 1200 includes a communication terminal 1202 capable of communication through radio links or cables, a prepaid deposit management device 1204 for managing money deposited in advance for payment of telephone charges of the communication terminal 1202, a prepaid number management device 1212 for managing assignment of prepaid numbers as described below, a charge system 1226 for calculating telephone charges that should be paid by the user of the communication terminal 1202, and a call counts management switching unit 1230 for managing call counts of communication terminals and making communications through communication lines possible.

In the following description, it is assumed that the communication terminal 1202 has a unique phone number (or identification number), and is capable of mobile communication. As a typical example, it is a cellular phone for mobile communication. The prepaid deposit management device 1204 includes a web server 1206 functioning as an interface for radio, communication with the communication terminal 1202, a deposit data base 1208 storing data of the amount of the deposited money for communication terminals, and a prepaid number request unit 1210 connected with the deposit data base 1208 and the web server 1206.

The deposit data base 1208 stores data of the amount of the deposited money for each phone number. An amount of money may be deposited to the deposit data base 1208 by directly accessing the deposit data base 1208, or through bank accounts, convenience stores or others places.

The prepaid number management device 1212 in the prepaid system 1200 includes a prepaid number responding unit 1214 that is operated to respond to requests from the prepaid deposit management device 1204, a prepaid number data base 1216 storing prepaid numbers and the relevant information, a web server 1218 functioning as an interface of radio communication with the communication terminal 1202, a charge unit 1220 connected with the prepaid number data base 1216 and the web server 1218, a user management data base 1222 connected to the charge unit 1220 for managing telephone numbers of users, group numbers, contract detail, and prepaid counts, and a charge management data base 1224 connected to the charge unit 1220 for managing remitted counts, transferred counts, and phone numbers of relevant users.

The charge system 1226 is connected to the charge unit 1220 in the prepaid number management device 1212. The charge system 1226 calculates the charge after each phone call made by the communication terminal 1202 according to duration and content of the phone call, and the user of the communication terminal 1202 will be requested to pay for this charge afterwards. Because users pay for the telephone charges on request after phone calls, the charge system 1226 is a "payment on request" charge system. The charge system 1226 further includes a charge data base 1228.

The call counts management switching unit 1230 is connected with the charge unit 1220 in the prepaid number management device 1212, and has a call counts data base 1232 for managing call counts of specific communication terminals (for example, prepaid cellular phones). Based on call counts set before phone calls, the call counts management switching unit 1230 allows communication terminals to communicate through communication lines within the amount of the preset call counts. The call counts related to a communication terminal decrease along with the duration of a phone call made by the communication terminal. The communication terminal is able to communicate until its call counts become zero.

Because users set onerous call counts before phone calls, the call counts management switching unit 1230 is a "prepayment" charge system.

How a communication terminal makes payments, by prepayment or on request after phone calls, depends on the contract made when the communication terminal is purchased, and the details of the contract are managed by the user management data base 1222. Therefore, the charge unit 1220 is able to determine how a communication terminal makes payments based on the contract detail registered in the user management data base 1222.

Next, the operation of the prepaid system 1200 is explained below by using the following examples.

FIRST EXAMPLE

For simplicity, an explanation is made of a case in which a user A uses his own communication terminal 1202 to obtain a prepaid number corresponding to 10000 Yen, and remits a part (for example, 1000 Yen) of the money of the prepaid number to user B to pay for telephone charges of user B, that is, a so called "fractional remittance", or generally, "fractional payment". For example, the communication terminal 1203 (as shown in FIG. 12) of user B is a prepaid cellular phone used by prepayment only.

First, user A obtains a prepaid number corresponding to 10000 Yen following the same procedure as described in the first embodiment (particularly, that in FIG. 4). Then, user A remits 1000 Yen to user B following the same procedure as described in the second embodiment.

Specifically, the communication terminal 1202 accesses the charge unit 1220 through the web server 1218 while specifying the phone number of the target (here, the phone number of user B), and the amount of money to be remitted (here, 1000 Yen). The charge unit 1220 confirms matters such as whether user A and user B are subscribers of the present service, and whether the amount of money is valid, and so on, and informs the communication terminal 1203 of user B of the remittance request of user A. This notification may be made by using an electronic mail (e-mail) message shown in FIG. 13. Further, when a greeting service is used to send e-mail to the target (user B) on birthdays, anniversaries, or other special days, in addition to the phone number of the target and the amount of money to be remitted, user A may also include the desired date of delivering the e-mail, text or image messages from user A, and a declaration of the request of the fractional payment for user B as illustrated in FIG. 13.

FIG. 14 through FIG. 16 show examples of data managed in every data base at the present step.

As shown in FIG. 14, in the user management data base 1222, the available deposit (or the remaining counts), group numbers, contract details, and so on, are managed for each phone number (or each user). A group number is a main number, that is, a number assigned to a plurality of communication terminals so that the plurality of communication terminals can be specified as a whole. In the example shown in FIG. 14 user A is not assigned a group number, while a group number Gn is assigned to user B and user C. The user management data base 1222 also stores contract details such if a communication terminal is a common terminal, or a terminal used only by prepayment. As shown in FIG. 16, at present stage, the available call counts of the communication terminal 1203 of user B is set to be zero in the call counts data base 1232 of the call counts management switching unit 1230.

As shown in FIG. 15, in a period from the time when user A makes the request of remittance to the time when the intention of user B is confirmed, the charge management data base 1224 manages data relevant to states in this period, such as the remitted counts (1000 counts), information of source of remittance (user A), and target of remittance (user B). In FIG. 15, the flag in the rightmost column represents whether the remittance request from user A is still valid, that is, within a valid period. For example, one week is set as a period for waiting for user B to declare his intention. When the flag is "ON", it indicates the remittance request is within the period (one week), so is still valid, while if the flag is "OFF", it indicates the valid period has elapsed. Note that this flag is also set to OFF after the intention of user B has been confirmed.

Next, after user B responds to the notification of remittance sent by e-mail, data in every data base are updated as shown in FIG. 17 through FIG. 19, and the routine of the remittance proceeds.

In the user management data base 1222, as shown in FIG. 17, after subtracting 1000 counts from the original remaining counts 10000, the new remaining counts of user A become 9000, and this value is recorded in the user management data base 1222. Note that this processing for decreasing the remaining counts of user A may be performed immediately after user A makes the request of the remittance.

In the charge management data base 1224, as shown in FIG. 18, the flag becomes OFF, indicating that the prepaid system 1200 is not waiting for the response of user B. In the call counts data base 1232, as shown in FIG. 19, 1000 counts are added to user B. Therefore, user B is able to make phone calls using the communication terminal 1203 through communication lines within 1000 call counts. Note that only user B can use these 1000 counts; because the remaining counts of user B is zero in the user management data base 1222, user B cannot transfer any call counts to other users.

SECOND EXAMPLE

Next, an explanation is made of a case in which a user A uses his own communication terminal 1202 to obtain a prepaid number corresponding to 10000 Yen, and remits parts (for example, 1000×2 Yen) of the money of the prepaid number to user B and user C to pay for telephone charges of user B and user C, that is, the so-called "fractional remittance", or generally, "fractional payment". For example, the communication terminal 1203 (as shown in FIG. 12) of user B is a prepaid cellular phone used by prepayment only, and the communication terminal of user C (not shown) is a common cellular phone, which pays for the telephone charges on request after phone calls.

In this case, first, user A obtains a prepaid number corresponding to 10000 Yen by the same procedure as described in the first embodiment. Then, user A may specify user B and user C as targets, respectively, and perform remittance as described above. Specifically, the remittance is made for user B as described in the first example, and for user C as described in the second embodiment. Nevertheless, according to this procedure, it is complicated for user A to set the targets separately. So, in this example, the remittance is made for user B and C by using the group number Gn assigned to them. Here, it is assumed which group a user belongs to is determined beforehand and recorded in the user management data base 1222 as shown in FIG. 20.

The charge unit 1220, which receives a request of remittance using the group number Gn, accesses the user management data base 1222, and goes through the same procedure as step 606 through 610 described in FIG. 6 and makes confirmations. As shown in FIG. 21, after it is confirmed that treatment of the request of remittance is to be continued, the values of the remitted counts from user A to targets user B and user C having a specified group number Gn are updated to 1000 Yen in the charge management data base 1224. At the present stage, as shown in FIG. 22 and FIG. 23, because the intentions of user B and user C have not been confirmed yet, the available counts of user B in the call counts data base 1232 and the remitted counts of user C in the charge data base 1228 are still zero.

Then, user B and user C are informed by e-mail of the request of remittance made by user A to the prepaid system 1200. After user B and user C respond to the notification of remittance sent by e-mail, data stored in every data base are updated as shown in FIGS. 25 through 27, and the routine of the remittance proceeds.

In the user management data base 1222, as shown in FIG. 24, after subtracting 2000 counts from the original remaining counts 10000, the new remaining counts of user A become 8000, and this value is recorded in the user management data base 1222. Note that this process of decreasing the remaining counts of user A can be performed immediately after user A makes the request of remittance.

In the charge management data base 1224, as shown in FIG. 25, the flag becomes OFF, indicating that the prepaid system 1200 is not waiting for the response of user B. In the call counts data base 1232, as shown in FIG. 26, 1000 counts are added to user B, so, user B is able to make phone calls using the communication terminal 1203 through communication lines within 1000 call counts.

In the charge data base 1228, as shown in FIG. 27, 1000 counts are also added to user C, that is, user C has paid for his telephone charges worth of 1000 counts, so, these 1000 counts will be subtracted from the telephone charges to be requested by the charge system 1226 next time.

In this way, based on details of contracts registered in the user management data base 1222, the charge unit 1220 decides to access the charge system 1226 as described in the second embodiment, or the call counts data base 1232 as shown in the present embodiment. Therefore, when specifying a group number, it is possible to specify a group number to communication terminals which pay for their telephone charges in different ways. As a result, one user (for example, user A) is able to remit his own prepaid counts to various kinds of users by the same method.

THIRD EXAMPLE

Next, an explanation is made of a case in which a user A uses his own communication terminal 1202 to obtain a prepaid number corresponding to 10000 Yen, and transfers a part (for example, 1000 Yen) of the money of the prepaid number to user B. As already described in the second embodiment, the transferred counts and the remitted counts are different from each other in the respect that the transferred counts are not used to pay for telephone charges or converted to call counts immediately; these counts can be held by the target user (here, user B) as his remaining counts. The transferred counts can be used for payment of one's own telephone charges, or used as one's own call counts, and alternatively, one may also remit or transfer all or a part of the transferred counts to other users.

In this example, first, user A obtains a prepaid number corresponding to 10000 Yen following the same procedure as described in the first embodiment. Then, user A transfers 1000 Yen to user B according to the same procedure as described in the second embodiment. Specifically, the communication terminal 1202 accesses the charge unit 1220 through the web server 1218 while specifying the phone number of the target of transfer (here, the phone number of user B), and the amount of money to be transferred (here, 1000 Yen). The charge unit 1220 confirms matters such as whether user A and user B are subscribers of the present service, and whether the amount of money is valid, and so on, and informs the communication terminal 1203 of user B of the transfer request of user A. This notification may be made by using an electronic mail message as shown in FIG. 13.

FIG. 28 and FIG. 29 show examples of data managed in every data base at the present step.

As shown in FIG. 28, in the user management data base 1222, the remaining counts of user A are 10000, while those of user B and user C are zero.

As shown in FIG. 29, in a period from the time when user A makes the request of transfer to the time when the intention of user B is confirmed, the charge management data base 1224 manages data relevant to states in this period, such as the transferred counts (here, 1000 counts) from user A (so-called "source") to user B (so-called "target"), and information of the source and target.

Next, after user B responds to the notification of transfer sent by an e-mail, data in every data base are updated as shown in FIG. 30 and FIG. 31, and the routine of the transfer proceeds.

In the user management data base 1222, as shown in FIG. 30, after subtracting 1000 counts from the original remaining counts 10000, the remaining counts of user A become 9000, while the remaining counts of user B are increased by 1000. These values are recorded in the user management data base 1222.

In the charge management data base 1224, as shown in FIG. 31, the flag becomes OFF, indicating that the prepaid system 1200 is not awaiting the response of user B, and 1000 counts are transferred to user B. Therefore, user B is able to make phone calls using the communication terminal 1203 through communication lines within 1000 call counts, in addition, user B can also remit or transfer all or a part of the transferred counts to other users. In order to make phone calls using these 1000 counts, these counts have to be converted into the remaining counts or call counts of user B, as shown in FIG. 19. This increases the call counts of user B.

FOURTH EXAMPLE

Next, an explanation is made of a case in which a user A uses his own communication terminal 1202 to obtain a prepaid number corresponding to 10000 Yen (FIG. 32), and transfers parts (for example, 1000×2 Yen) of the money of the prepaid number to user B and user C. For example, the communication terminal 1203 (as shown in FIG. 12) of user B is a prepaid cellular phone used by prepayment only, and the communication terminal of user C (not shown) is a common cellular phone, which pays for the telephone charges on request after phone calls.

In this case, first, user A obtains a prepaid number corresponding to 10000 Yen by the same procedure as described in the first embodiment. Then, user A may specify user B and user C as targets, respectively, and transfer 1000 counts of his to each user B and user C as described above. Nevertheless, according to this procedure, it is complicated for user A to set the targets separately. So, in this example, the transfer is made for user B and C by using the group number Gn assigned to them. Here, it is assumed which group a user belongs to is determined beforehand and recorded in the user management data base 1222 as shown in FIG. 32.

The charge unit 1220, which receives a request of transferring a part of the remaining counts of user A by using the group number Gn, accesses the user management data base 1222, and goes through the same procedure as step 606 through 610 described in FIG. 6 and makes confirmations. After it is confirmed that treatment of the request of transfer is to be continued, as shown in FIG. 33, in the charge management data base 1224, the values of the counts to be transferred from user A to the targets of transfer, that is, user B and user C specified by the group number Gn, are updated to 1000 Yen. At the present stage, as shown in FIG. 32 and FIG. 33, because the intentions of user B and user C have not been confirmed yet, the available counts (remaining counts) of user B and the transferred counts of user C are both zero.

Then, user B and user C are informed by e-mail of the transfer request made by user A to the prepaid system 1200. After user B and user C respond to the notification of transfer sent by e-mail, data stored in every data base are updated as shown in FIG. 34 and FIG. 35, and the routine of transfer proceeds.

In the user management data base 1222, as shown in FIG. 34, after subtracting 2000 counts from the original remaining counts 10000, the new remaining counts of user A become 8000, while the remaining counts of user B and C are both increased by 1000. These values are recorded in the user management data base 1222.

In the charge management data base 1224, as shown in FIG. 35, the flags become OFF, indicating that the prepaid system 1200 is not waiting for the response of user B. So, 1000 counts are transferred to user B and user C, respectively. As a result, both user B and user C are able to make phone calls using their communication terminals through communication lines within 1000 call counts; in addition, user B and C can also remit or transfer all or a part of the transferred 1000 counts to other users.

According to the third embodiment, the prepaid number management device 1212 is connected to both the charge system 1226 which charges telephone charges after calls, and the call counts management switching unit 1230 for managing call counts set onerously before phone calls (a prepayment charge system). Accordingly, call counts remittance or transfer can be made for not only communication terminals which pay phone charges on request after phone calls, but also communication terminals which pay phone charges by preset onerous call counts. Therefore, users have more choices than in the second embodiment. In the second embodiment, service can be provided only for the common communication terminals utilizing the charge system 1226 that requests payment after calls; in contrast, according to the present embodiment, communication terminals like prepaid-only cellular phones can also be service objects.

According to the present embodiment, the same as the second embodiment, it becomes possible to remit or transfer all or a part of one's prepaid counts to others. For example, the General Affair Department of a company purchases high-amount prepaid cards, and transfers parts of the prepaid counts of these cards to each department of the company. Each department further remits these prepaid counts to pay for phone charges of their staffs.

Furthermore, in the present embodiment, the user management data base manages data of methods of payment for every communication terminal, which are determined by contract, so the charge unit is able to determine how a communication terminal makes payments based on the contract detail registered in the user management data base.

Accordingly, in the above example, when a department remits prepaid counts to pay for telephone charges of its staff, there is no need to check how a communication terminal of a staff member pays (prepayment or payment-on-request). For example, when a department remits 1000 counts to a staff member, the prepaid system is able to select an appropriate charge system automatically, that is, if the staff member pays on request after phone calls, the phone charges of the staff member for the next month will be decreased by 1000 counts; if the staff member makes prepayments for his communication terminal, his call counts are increased by 1000 counts. So, the department is able to provide a value worth 1000 call counts for the staff member no matter which kind of payment is made.

According to the present embodiment, a common group number is set for a plurality of communication terminals to substitute for individual phone numbers assigned to each communication terminal, and therefore, all the communication terminals belonging to the group can be specified for remittance or transfer at one time, making the setting of the targets and source easier.

According to the present embodiment, there are provided more choices than in the related art for a user to use his own call counts, such as, remit or transfer all or a part of call counts, specify a number destinations of remittance and transfer individually, or specify a number of destinations of remittance and transfer as one group, and so on. Because a large amount of prepaid counts needs a large variety of means to use the counts, the present invention is helpful in improving the convenience of the high-amount prepaid cards. In addition, it is advantageous to the prepaid system to purchase the high-amount prepaid cards and use a large amount of prepaid counts, so the cumbersome activity of issuing and using a large number of low-amount prepaid cards is eliminated.

While the present invention has been described with reference to specific embodiments chosen for purpose of illustration, it should be apparent that the invention is not limited to these embodiments, but numerous modifications could be made thereto by those skilled in the art without departing from the basic concept and scope of the invention.

In the above embodiments, explanations are made taking as an example the case of telephone charges of communication terminals, but the present invention is not limited to telephone charges; it is applicable to any system in which the target of payment is fixed in advance.

Summarizing the effect of the present invention, cumbersome activity caused by issuing and using a large number of prepaid cards is eliminated.

What is claimed is:

1. A prepaid system, comprising: a prepaid deposit management unit configured to manage a deposit of a communication terminal;
    a prepaid number management unit configured to provide a prepaid number for the prepaid deposit management unit;
    a prepaid charge unit configured to authenticate the prepaid number; and
    a charge system configured to charge for a communication made by the communication terminal, wherein the prepaid number management unit transmits a prepaid number related to a predetermined amount of money to the communication terminal through the prepaid deposit management unit in response to a request of the communication terminal when the deposit of the communication terminal is greater than the predetermined amount of money, and subtracts the predetermined amount of money from the deposit of the communication terminal; and the prepaid number is sent from the communication terminal to the charge system through the prepaid charge unit to pay for a communication charge of the communication terminal by using the predetermined amount of money related to the prepaid number.

2. A prepaid deposit management server for managing a deposit of a communication terminal, comprising:

a request receiving unit configured to receive a first request from the communication terminal for obtaining a prepaid number related to a predetermined amount of money;

a request transmitting unit configured to transmit a second request to a prepaid number management unit for being transmitted the prepaid number, said prepaid number management unit being configured to manage a plurality of prepaid numbers;

a prepaid number receiving unit configured to receive the prepaid number from the prepaid number management unit when the deposit of the communication terminal is greater than the amount of money related to the prepaid number; and a prepaid number transmitting unit configured to transmit the prepaid number received from the prepaid number management unit to the communication terminal.

3. The prepaid deposit management server as claimed in claim 2, wherein deposits of a plurality of communication terminals are managed according to identification numbers thereof, each identification number being in unique correspondence with one of the communication terminals.

4. The prepaid deposit management server as claimed in claim 2, wherein the prepaid number is transmitted to the communication terminal while being included in data of a location of a prepaid charge unit, said prepaid charge unit being configured to authenticate the prepaid number sent from the communication terminal.

5. A method of a prepaid system including a prepaid deposit management unit configured to manage a deposit of a communication terminal, a prepaid number management unit configured to provide a prepaid number for the prepaid deposit management unit, and a prepaid charge unit configured to authenticate the prepaid number; comprising the steps of:

the communication terminal making a first request to the prepaid deposit management unit for being provided with a prepaid number related with a predetermined amount of money;

the prepaid deposit management unit making a second request to the prepaid number management unit for being provided with the prepaid number related to the amount of money in response to the first request;

the prepaid number management unit, in response to the second request, transmitting a prepaid number as the requested prepaid number to the prepaid deposit management unit based on a result of a comparison between the deposit of the communication terminal and the amount of money related to the prepaid number;

the prepaid deposit management unit transmitting the prepaid number transmitted from the prepaid number management unit to the communication terminal;

the communication terminal sending the prepaid number transmitted from the prepaid deposit management unit to the prepaid charge unit to pay for a communication charge of the communication terminal;

the prepaid charge unit authenticating the prepaid number sent from the communication terminal, and transmitting data of the authenticated prepaid number to a charge system, said charge system calculating the communication charge based on the amount of money related to the authenticated prepaid number.

6. A method of a prepaid deposit management server for managing a deposit of a communication terminal, comprising the steps of:

receiving a first request from the communication terminal for obtaining a prepaid number related to a predetermined amount of money;

transmitting a second request to a prepaid number management unit for being transmitted the prepaid number, said prepaid number management unit being configured to manage a plurality of prepaid numbers;

receiving a prepaid number as the requested prepaid number from the prepaid number management unit when the deposit of the communication terminal is greater than the amount of money related to the prepaid number; and transmitting the prepaid number received from the prepaid number management unit to the communication terminal.

7. A prepaid system, comprising: a user data base storing a plurality of identification numbers of a plurality of communication terminals, and a plurality of prepaid counts each being convertible into a communication charge, each of said identification numbers being made in correspondence with one of said prepaid counts;

a prepaid charge unit configured to modify a value of a prepaid count in the user data base; and a first charge system configured to calculate a communication charge of a communication terminal and request the communication terminal to pay for the communication charge, wherein the prepaid charge unit modifies a value of a prepaid count of a first communication terminal when the first communication terminal requests to assign at least a part of the prepaid count of the first communication terminal to a second communication terminal specified by the first communication terminal; and the first charge system decreases a communication charge of the second communication terminal by subtracting said at least a part of the prepaid count from the communication charge of the second communication terminal when requested by the prepaid charge unit.

8. The prepaid system as claimed in claim 7, further comprising a second charge system configured to charge for a communication of a communication terminal based on a communication count set in advance, said communication count decreasing along with the duration of the communication made by the communication terminal, wherein the second charge system, when requested by the prepaid charge unit, increases the communication count of the second communication terminal by assigning at least a part of the prepaid count of the first communication terminal to the communication count of the second communication terminal.

9. The prepaid system as claimed in claim 8, wherein the user data base further stores payment methods of said communication terminals; and the payment methods include a first payment method by using the first charge system, and a second payment method by using the second charge system.

10. The prepaid system as claimed in claim 7, wherein the first communication terminal specifies a plurality of the second communication terminals at one time using a group number.

11. A prepaid charge device that modifies data stored in a user data base in response to a request from a communication terminal, said user data base storing a plurality of identification numbers of a plurality of communication terminals, and a plurality of prepaid counts each being convertible into a communication charge, each of said identification numbers being made in correspondence with one of said prepaid counts, said prepaid charge device modifying a value of a prepaid count related to a first communication terminal when the first communication terminal requests to assign at least a part of the prepaid count of the first communication terminal to a second communication terminal specified by the first communication terminal; and said prepaid charge device requesting a first charge system to decrease a communication charge of the second communication terminal by subtracting said at least a part of the prepaid count from the communication charge of the second communication terminal, said first charge system being configured to calculate a communication charge of a communication terminal and request the communication terminal to pay for the communication charge.

12. The prepaid charge device as claimed in claim 11, wherein the prepaid charge device requests a second charge system to increase a communication count of the second communication terminal by assigning at least a part of the prepaid count of the first communication terminal to the communication count of the second communication terminal, said second charge system being configured to charge a communication of a communication terminal based on the communication count set in advance, said communication count decreasing along with duration of the communication made by the communication terminal.

13. The prepaid charge device as claimed in claim 12, wherein the user data base further stores payment methods of said communication terminals; and the payment methods include a first payment method by using the first charge system, and a second payment method by using the second charge system.

14. The prepaid charge device as claimed in claim 11, wherein the first communication terminal specifies a plurality of the second communication terminals at one time using a group number.

15. The prepaid charge device as claimed in claim 11, wherein the prepaid charge device informs the second communication terminal of a request of the first communication terminal, when the first communication terminal makes the request to modify the value of the prepaid count to assign said at least a part of the prepaid count of the first communication terminal to the second communication terminal; and modifies the value of the prepaid count when the second communication terminal makes a response.

16. A prepaid method, comprising:

a first step of transmitting a request to a second communication terminal for assigning at least a part of a prepaid count of a first communication terminal to the second communication terminal specified by the first communication terminal, said prepaid count being convertible into a communication charge, and a plurality of said prepaid counts being stored in a user data base in correspondence with a plurality of identification numbers of a plurality of communication terminals;

a second step of modifying a value of the prepaid count of the first communication terminal in the user data base in response to the request; and a step of requesting a first charge system to decrease a communication charge of the second communication terminal by subtracting said at least a part of the prepaid count from the communication charge of the second communication terminal, said first charge system being configured to calculate a communication charge of a communication terminal and request the communication terminal to pay for the communication charge.

17. The prepaid method as claimed in claim 16, further comprising a step of requesting a second charge system to increase a communication count of the second communication terminal by assigning at least a part of the prepaid count of the first communication terminal to the communication count of the second communication terminal, said second charge system being configured to charge a communication of a communication terminal using a communication count set in advance, said communication count decreasing along with duration of the communication made by the communication terminal.

18. The prepaid method as claimed in claim 16, wherein the data stored in the user data base further include payment methods of the communication terminals; and the payment methods include a first payment method by using the first charge system and a second payment method by using the second charge system.

19. The prepaid method as claimed in claim 16, wherein the first communication terminal specifies a plurality of the second communication terminals at one time using a group number.

20. The prepaid method as claimed in claim 16, wherein the second step further includes the steps of: informing the second communication terminal of the request; and modifying the value of the prepaid count when the second communication terminal makes a response.

* * * * *